(No Model.) 2 Sheets—Sheet 1.
H. G. SCHUMACHER.
INSECT POWDER DISTRIBUTER.

No. 511,805. Patented Jan. 2, 1894.

Witnesses

Inventor
Hermann G. Schumacher
by
Attorneys (No Model.) 2 Sheets—Sheet 2.

H. G. SCHUMACHER.
INSECT POWDER DISTRIBUTER.

No. 511,805. Patented Jan. 2, 1894.

Witnesses

Inventor
Hermann G. Schumacher
Attorneys

UNITED STATES PATENT OFFICE.

HERMANN G. SCHUMACHER, OF HOCKHEIM, ASSIGNOR OF ONE-HALF TO JOHN MUELLER, OF MOULTON, TEXAS.

INSECT-POWDER DISTRIBUTER.

SPECIFICATION forming part of Letters Patent No. 511,805, dated January 2, 1894.

Application filed May 13, 1893. Serial No. 474,129. (No model.)

*To all whom it may concern:*

Be it known that I, HERMANN G. SCHUMACHER, a citizen of the United States, residing at Hockheim, in the county of De Witt and State of Texas, have invented a new and useful Poison-Distributer, of which the following is a specification.

The invention relates to improvements in poison distributers, for destroying vermin, insects and the like.

The object of the present invention is to provide for destroying vermin and insects, such as cotton worms, and the like, a poison distributer, which may be readily adjusted to direct properly the discharge, and which will insure a constant feed of the poison without liability of clogging.

The invention consists in the construction and novel combination and arrangement of parts hereinafter fully described, illustrated in the accompanying drawings and pointed out in the claims hereto appended.

Figure 1:
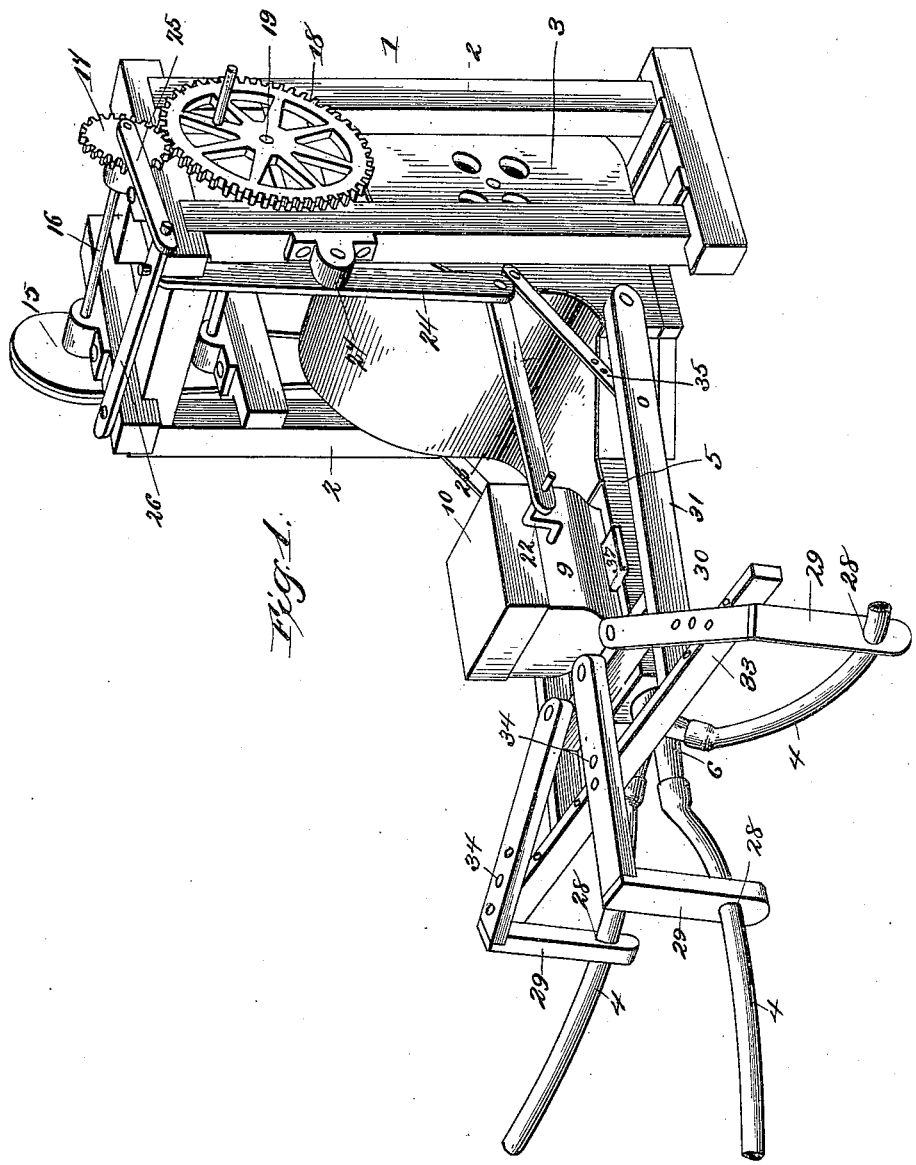
Figure 2:
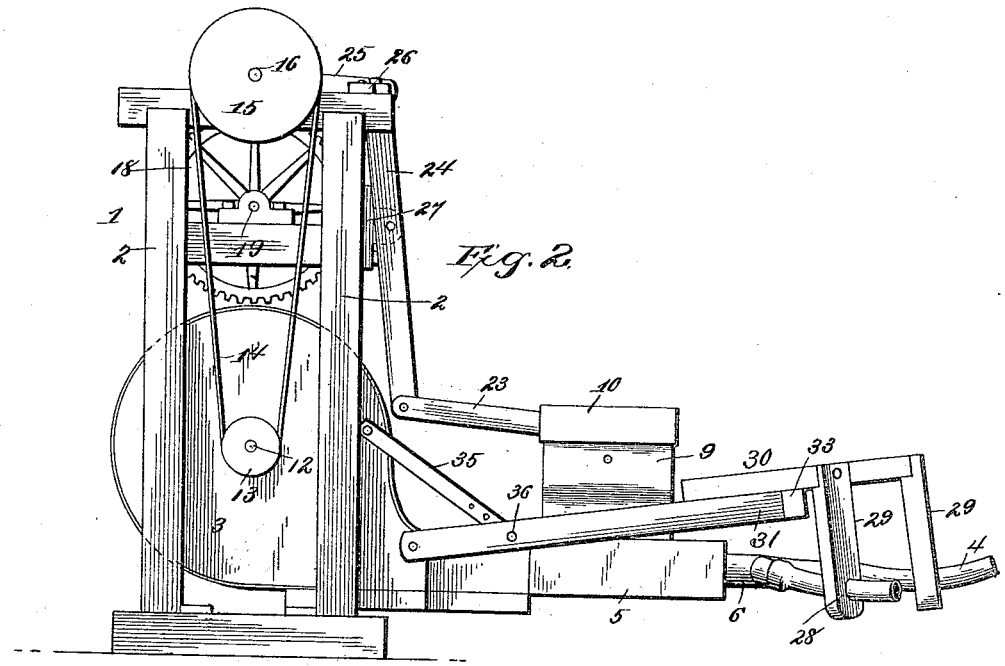
Figure 3:
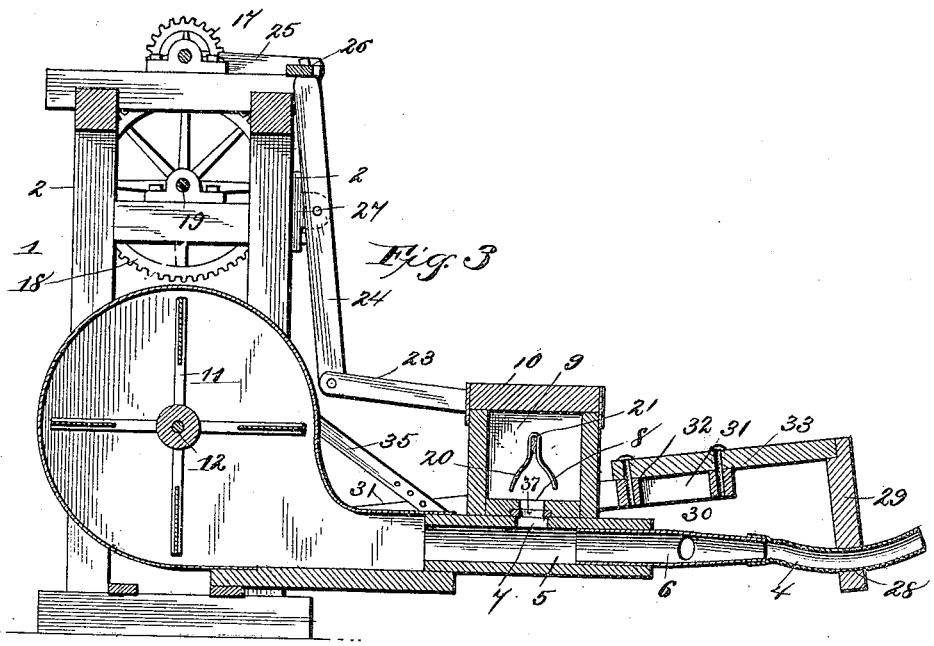

In the drawings—Figure is a perspective view of a poison distributer constructed in accordance with this invention. Fig. 2 is a side elevation of the same. Fig. 3 is a central longitudinal sectional view.

Like numerals of reference indicate corresponding parts in all the figures of the drawings.

1 designates a supporting frame having corner uprights 2, and arranged between the sides of the frame is a blower 3 having an approximately cylindrical casing, which is extended forward, and is connected with flexible discharge tubes 4. The front of the casing has a rectangular horizontally disposed forwardly projecting tubular extension 5, to the front end of which is attached a tube having three branches 6, having the inner ends of the flexible discharge tubes secured to them.

The extension 5 of the blower casing is provided in its top with an opening 7, registering with an opening 8 in the bottom of a poison receptacle 9, which is mounted upon the extension 5, and which is provided with a cover 10.

The blast fan 11 of the blower is mounted on a shaft 12, which is extended through one side of the fan or blower casing, and carries a small pulley 13. The small pulley receives motion by a belt 14 of cord or other suitable material, from a large pulley 15; the large pulley is mounted on one end of the shaft 16, which carries a pinion 17 at its other end; and the pinion meshes with a large cog wheel 18, which is provided with a handle by which it is operated. The large cog wheel is secured to the end of a shaft 19, which is journaled in suitable bearings of the frame.

In order to insure a positive discharge of poison an agitator 20 is arranged within the poison receptacle and is mounted on and depends from a rock-shaft 21, which is provided at one end with a crank arm 22. The agitator consists of downwardly inclined diverging arms or sides, which work back and forth in the poison receptacle above the opening in the bottom thereof to prevent the poison clogging. The crank arm 22 of the rock-shaft 21 is connected by a pitman 23 with the lower end of a vertically disposed oscillating lever 24, which is connected with a wrist-pin of the pinion 17 by a pitman 25 and a horizontally disposed oscillating lever 26. The vertically disposed oscillating lever 24 is fulcrumed intermediate of its ends on a bearing 27 of the frame, and has its upper end pivotally connected with the horizontal oscillating lever 26 near one end thereof. The other end of the horizontal oscillating lever is fulcrumed on the frame, while the end adjacent to the vertically disposed oscillating lever is pivoted to the forward end of the pitman 25. By this construction the agitator is oscillated through the gearing for rotating the fan of the blower.

The flexible discharge tubes are arranged in openings 28 of depending front portions of pivoted L-shaped arms 29, which are mounted upon an adjustable frame 30. The adjustable frame consists of parallel side bars 31, which are pivoted to opposite sides of the blower casing, an intermediate cross-bar 32 to which the inner ends of the horizontal portions of the L-shaped discharge tube supporting arms 29 are permanently pivoted, and a front cross-bar 33 to which the L-shaped arms or supports 29 are detachably fastened in their adjustment by pins 34. The L-shaped arms or supports 29 by having the rear ends of their horizontal portions permanently pivoted to the cross-bar 32 are adapted to swing horizontally to adjust the discharge tubes laterally of the frame; and they may be secured in their adjustment by any suitable means, such as the pins 34 and suitable perforations in which the pins are dropped after the arms have been properly arranged. The pivoted frame 30 is adapted to be swung upward and downward to bring the flexible discharge tubes at the proper elevation to suit the plants to be operated on, and it is secured in its adjustment by link bars 35 pivoted at their upper ends to the sides of the blower casing and provided at their lower ends with adjusting perforations adapted for the reception of pins 36, which fit in perforations of the side bars of the pivoted frame. The pivoted L-shaped discharge tube supports enable the discharge tubes to be arranged properly according to the width of the rows of plants on which the poison is to be discharged.

It will be seen that the poison distributer is simple and comparatively inexpensive in construction, that it is adapted to be readily operated, and that the discharge tubes may be readily adjusted to regulate the discharge of the poison.

Changes in the form, proportion and the minor details of construction may be resorted to without departing from the principle or sacrificing any of the advantages of this invention.

The discharge of the poison is regulated by a slide 37, which is mounted at the bottom of the receptacle 9 in a suitable way thereof. The slide is provided with an opening, which may be made to register fully or partially with the openings 7 and 8 of the blower casing and the bottom of the poison receptacle; and the slide is adapted to close these openings when desired.

What I claim is—

1. In a poison distributer, the combination of a blower, flexible discharge tubes connected therewith, a poison receptacle communicating with the blower, and a vertically adjustable frame provided with supports receiving and holding the discharge tubes and capable of swinging in a horizontal plane to effect the lateral adjustment of the discharge tubes, substantially as described.

2. In a poison distributer, the combination of a blower, flexible discharge tubes, a poison receptacle, a frame pivoted at its rear end and capable of vertical adjustment, means for securing the frame in its adjustment, and supports pivoted to the frame at the front thereof and capable of swinging horizontally to effect a lateral adjustment and provided with fastening devices and having depending portions receiving the discharge tubes, substantially as described.

3. In a poison distributer, the combination of a main frame, a blower, discharge tubes, a poison receptacle, a rock-shaft journaled in the poison receptacle, an agitator mounted on the rock-shaft, a vertically disposed oscillating lever having its lower end connected with the rock-shaft, a pinion mounted on the frame and having a wrist pin, a pitman connected to the wrist pin and with the upper end of the oscillating lever, and a cog-wheel meshing with the pinion, substantially as described.

4. In a poison distributer, the combination of a main frame, a blower, discharge tubes, a poison receptacle, a rock-shaft journaled in the poison receptacle and having a crank-arm, an agitator carried by the rock-shaft, a shaft 16 journaled in suitable bearings of the frame, gearing arranged at one end of the shaft 16 and connecting the same with the fan of the blower, a pinion mounted on the other end of the shaft 16 and having a wrist-pin, a cog-wheel meshing with the pinion, a vertically disposed oscillating lever fulcrumed on the frame and having its lower end connected with the crank-arm of the rock-shaft, a horizontally disposed oscillating lever fulcrumed on the frame and pivotally connected to the upper end of the vertically disposed oscillating lever and projecting beyond the same, and a pitman connecting the projecting end of the horizontal lever with the wrist-pin of the pinion, substantially as described.

In testimony that I claim the foregoing as my own I have hereto affixed my signature in the presence of two witnesses.

HERMANN G. SCHUMACHER.

Witnesses:
   G. J. BOHNENKAMP,
   D. LOCKMANN.